United States Patent [19]

Pitencel

[11] Patent Number: 5,622,405
[45] Date of Patent: Apr. 22, 1997

[54] FLIP-UP HEADREST

[76] Inventor: Hector M. Pitencel, Salta 828, 1° 'D' (7600) Mar del Plata, Buenos Aires, Argentina

[21] Appl. No.: 541,558

[22] Filed: Oct. 10, 1995

Related U.S. Application Data

[63] Continuation-in-part of Ser. No. 227,244, Apr. 13, 1994, abandoned.

[51] Int. Cl.⁶ ..................................................... A47C 7/38
[52] U.S. Cl. ..................... 297/283.4; 297/405; 297/408
[58] Field of Search ..................... 297/391, 283.4, 297/408, 405

[56] References Cited

U.S. PATENT DOCUMENTS

| 408,823 | 8/1889 | Carrick | 297/405 |
|---|---|---|---|
| 534,582 | 2/1895 | Sargent | 297/391 X |
| 634,003 | 10/1899 | Gould | 297/405 X |
| 2,180,768 | 11/1939 | Peterson | 297/405 |
| 3,300,249 | 1/1967 | Schneider | 297/408 |

FOREIGN PATENT DOCUMENTS

| 210394 | 7/1977 | Argentina . | |
| 113645 | 7/1984 | European Pat. Off. | 297/408 |
| 29537 | 3/1969 | France | 297/408 |
| 2516771 | 5/1983 | France | 297/391 |
| 361693 | 3/1921 | Germany | 297/405 |
| 118574 | 1/1970 | Norway | 297/391 |
| 2037154 | 7/1930 | United Kingdom | 297/408 |

*Primary Examiner*—Peter R. Brown
*Attorney, Agent, or Firm*—Finnegan, Henderson, Farabow, Garrett & Dunner, L.L.P.

[57] ABSTRACT

A dual-aspect headrest especially suitable for use on a vehicle having a seatback for supporting a user of the vehicle, which headrest has (a) a support body having (i) a front face and (ii) a rear face having an anatomical cavity therein for supporting the head of a user of the vehicle, the support body having in an tipper edge thereof a nondeformable neck support having the shape of a semicircle and having an inner part, the neck support being open toward the rear face, and intersecting the anatomical cavity, and having a rigid inner core incorporated in the internal structure of the body, and a spongy material covering the core; (b) pivoting means pivotally connected to the body for pivoting the support body around a horizontal axis and allowing the body to be flipped over the seatback between a first position at which the front face faces the head of a user and a second position at which the rear face faces the head of a user, so that the anatomical cavity and the neck support are positioned to receive, respectively, the head and neck of a user; and (c) linking means for linking the body to the seatback, the linking means being connected to the pivoting means.

10 Claims, 10 Drawing Sheets

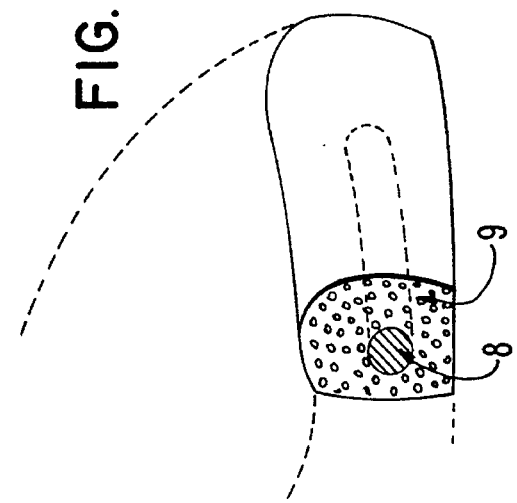
FIG. 11
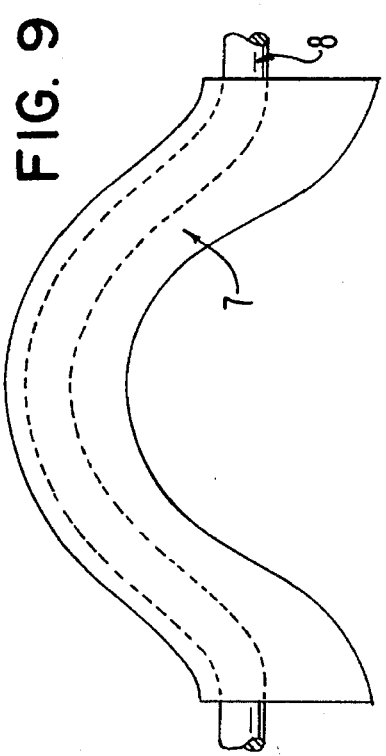
FIG. 9
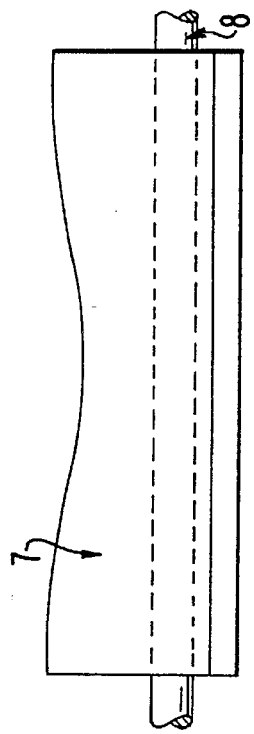
FIG. 10
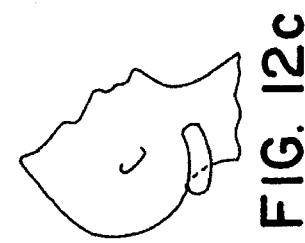
FIG. 12c
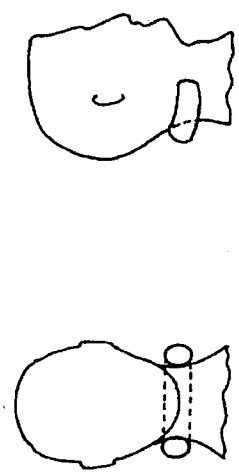
FIG. 12b
FIG. 12a h=h'  a'>a

FLIP-UP HEADREST

This is a continuation-in-part of application Ser. No. 08/227,244, filed Apr. 13, 1994, now abandoned.

FIELD OF THE INVENTION

The present application relates to an improved tip-up, dual-aspect headrest, especially suitable for seats of passenger transport facilities or vehicles, and which can also be used on armchairs and easychairs.

BACKGROUND OF THE INVENTION

It is well known and recognized by all that the major difficulty which people encounter when they wish to sleep while seated, even when they recline the backs of their seats, is that of being able to place their heads in a comfortable position which is sufficiently stable to prevent the involuntary movements of the head which occur, in various directions, during the unconsciousness of sleep, and which affect the spinal column as well as the muscle mass of the neck, and make it impossible to enjoy relaxed and prolonged rest.

It is also known that the head is itself heavy, and that when people are seated it is held in alignment with the central axis by the musculature of the neck, and is also carried by the spinal column. However, given that the centre of equilibrium is located in the cerebellum, when people are sleeping in this position, and they enter a state of unconsciousness, the cerebellum ceases sending out balancing stimuli to the musculature, while the permanently acting force of gravity, encountering no muscular resistance, presses on the head, turning it in every direction, producing traction forces on the neck and the spinal column, which alternately interrupt sleep, and mean that the persons frequently move their bodies in the search for a support position which neutralizes these effects, and instinctively move their bottoms forward and curve their backs, attempting to rest their heads as far back as possible, raising the chin.

This natural instinct results from the fact that the most comfortable way of sleeping while seated is when the nape passes behind the line of support of the back on the seatback, and the chin is raised to approximately the height or level of the ear lobe, since in this way the weight of the head itself is off-loaded onto the support of the back or seatback, and the spinal column is relieved of the direct vertical load and of the traction forces which are generated when the said weight is located on or in front of the said support line, respectively.

Simultaneously, when the head is placed in the rest position described, the musculature of the neck is relieved, since no frontal restraining forces are required, the persons achieving a comfortable position which, however, is only temporary, since, having their backs curved due to failure to take account of this natural tendency through adequate design of the seat, the whole of the weight falls on the hips, and afflicts people with pain in this region of the body.

The natural and logical instinct to push the nape behind the line of support of the back and to raise the chin to the level of the ear lobes is limited in existing seats by the seatback's own support line, even when the seatbacks have protuberances forward of this line, given that every pattern or element which projects from the support line of the seatback obliges the users to move the head in the opposite direction to that which corresponds to relieving the spinal column of the direct weight of the head and causes a traction force by lever action on the vertebrae and on the muscles of the neck, proportional to the movement made. This means that persons intending to avoid this inconvenience in the design, and seeking an ideal position, move their bottoms forward and automatically reduce the length of useful support, and require more space in front in which to place their legs.

However, it is known that vehicles come equipped with headrests on the backs of their seats, and that they fulfill a function of protecting the passenger, since they prevent the known pendulum effect by the head in the event of an impact. Many of the known headrests can tip up between two positions, one of them being a rest position in which the head is always supported overlying the line of support of the back.

Obviously, all the known headrests comply with the safety standards, but none of them allows the user to rest comfortably while his head is resting thereon, due to the fact that none of them is equipped with a support which is suitable to act as a new point of support and of load distribution which in turn contains the lateral movements of the head during sleep, and makes it possible to push the nape behind the line of support of the back and to raise the chin to the approximate height of the ear lobe, the ideal position for sleeping while seated, and which in turn makes it possible within the same overall measurements of a seat, to achieve an increase in the total useful support surface area, by which, automatically, the necessary space in which to place the legs is reduced, since the forward movements of the body, in the search for comfort, are not necessary.

Argentinian Patent No. 210.394 is known, which attempts to alleviate the above-mentioned drawbacks by means of the provision of a headrest applicable to any type of seat and which has lateral protuberances for partially limiting the movements of the head. It is clearly obvious on reviewing the cited patent, that it does not result in a really comfortable rest position for the user.

European Patent Application 0 133.645 is also known, which discloses a headrest which has a maximum tip-up position in which the user can rest his or her head, with the intention of offering a comfortable position for relaxation and sleep. It is clear on reviewing the cited patent that, in the invention, neither the causes nor the effects which generate and cause the discomforts which people suffer when they wish to relax while seated have been considered. Given that it deals with a headrest which is designed counter to what is required to achieve these conditions, since the central body intended to play a support role lacks a fastening element which actually acts as a support and divides the loads in such a way that the spinal column is not compressed by the heavy intrinsic weight of the head, and which, in turn, prevents the lateral movements of the head, negating any type of traction on the vertebrae and the musculature of the neck. It being obvious that only this body can be employed as a support for the nape, and that, given the erroneous concepts employed in its creation, tipping it to its rest position, forward of the line of support of the back, moving the user's head forward, which means that the whole weight of the head is supported by the spinal column and not by the central body of the headrest, that it does not act as a support, but that it serves only as a rest and, given its faulty shape, neither does it avoid the passenger's moving his legs forward, seeking a comfortable position in which to rest.

It also emerges clearly on reviewing the cited patent, that said headrest is constructed with a fixed perimetral structure. Being linked to the seatback by two rods, and with both the structure and the rods acting as limitations on the movements of the central body, whereby, although it might be wished to at least adopt a position which would make it possible to move the said body rearwards of the line of support of the back, this movement would be made impossible by the design itself, these conditions making it perfectly obvious that it is a headrest which is unsuited and unsuitable for achieving at least the minimum necessary conditions for relaxation, and that it was designed in a form opposed to the objectives sought.

French Patent 2 516.771 is also known, which discloses a design of a cushion overlaid on the back which is fixed thereto by means of a clip, and is formed by a single piece of spongy or inflatable material, and which has a cavity for inserting the head and a curved entry for the neck. It is clear on reviewing the cited patent that the only cause of discomfort which has been considered is the lateral movement of the head during sleep, and that the origin has not been correctly addressed, neither has the weight of the head itself on the spinal column been taken into account as a source of discomfort when persons wish to sleep while seated. This is obviously a design which only makes it possible to rest partially and for brief periods, by counteracting lateral movements, since, by not including a support which neutralizes the direct weight of the head on the spinal column, and since the nape is not allowed to rest behind the line of support of the back, the musculature of the neck is not completely relieved, neither is the spinal column freed of the compressive weight of the head. Consequently, any comfort which is achieved by supporting the head laterally, will only be momentary and transient, since it will frequently be interrupted by the discomfort caused by the above-mentioned effects.

It also becomes obvious on reviewing the cited patent that the curved entry is prevented from holding the head upright, as is claimed; this is because it is of inadequate design, and because it does not have sufficient strength for such a role, due to the fact that it is produced from the same spongy and flexible material which forms the so-called "single plate". By the mere fact that the user is supporting his head towards the rear, the mouth of the semicircle will open out and automatically be deformed, ceasing to hold the neck in line. The proof of this is that the inventor has seen it necessary to produce a somewhat deep cavity provided with ventilation grooves, since the only way of at least lightly retaining the head of the user against the lateral movement is by introducing the whole of the head into the said cavity. Hence it is easy to prove that, since the "single plate" has no rigidity, if the user is sleeping and his head tends to fall sideways, the deformation of the whole of the "single plate" will mean that the whole of the load will fall on the half of the belt which fastens it to the seatback, while the remaining half will slacken off towards the direction of inclination of the head, and will cancel out the lateral containment effect for which the "single plate" was created.

In addition, it becomes clear on reviewing the cited patent that although the "single plate" was provided with elements for stiffening, that it has not been provided; it would also be missing from the appropriate design, at least so that the curved entry should serve as a point of neutralization of the weight of the head, since its straight and vertical walls would not offer any resistance in this direction, and the spinal column would still remain as the support of the heavy weight of the head.

However it is known that, in order to travel or rest during a journey, passengers use cushions for the purpose of achieving acomfortable position for the head, the neck and the spinal column, but that said cushions move, since they do not have a fixed point of support and do not define any anatomical shape, and they never allow the nape to be stretched out behind the back.

SUMMARY OF THE INVENTION

Hence an object of the present invention is to remedy the above-mentioned drawbacks, and, without neglecting the safety standards and requirements, to provide the user with the possibility of resting comfortably, by means of an element which:

a) Neutralizes the head's own heavy weight by means of a support which is specially designed to absorb the loads, in such a way that the spinal column does not receive the direct and continuous weight of the head, and that said support acts as a new point of support and load distribution (P) on any seat to which it is fitted.

b) Makes it possible to tip the head back so that the nape is located behind the line of support of the back, raising the chin to the approximate height of the ear lobe, shifting the off-loading of the direct weight of the head onto the neutralizing support, which, in turn, accommodates the head on a specially spongy body, in such a way that the user obtains at least one position of real comfort for resting.

c) Comfortably and correctly holds both the neck and the head of the user, aligned with the central axis of the body, avoiding the lateral movements without the requirement for muscular effort.

d) Increases the length of the useful support surface area of the seat, with respect to other conventional seats which are of the same overall dimensions, when persons use it to sleep or rest, and consequently requires less space in front in which to place the legs.

e) Can be employed in intermediate positions as a support and retention for the neck only, reading, etc.

Hence the subject of the present invention is a tip-up, dual-aspect headrest, especially suitable for being used on vehicle seatbacks, of the type which has a support body and means for linking the same to the seatback, wherein the said body comprises a conventional front face and a rear face which has an anatomical cavity for supporting the head of the user, and said body has, formed in its upper edge, a neck support into which the neck of the passenger fits, said support having the shape of a semicircle which is open in the mouth of the arch, which intersects said anatomical cavity, and said neck support is nondeformable in order to absorb the loads, and is surrounded by a spongy material; and said linking means is provided with at least means for pivoting the said body around a horizontal axis which allows it to be turned between a vertical or conventional position and a position of maximum tip-up when pivoted approximately 140°. The terms "tip-up" and "tipped-up" are sometimes referred to herein as —flip-up and flipped-up—, respectively.

Hence the present invention resides in the novel combination of a body which has a particular shape, with means for linking to the vehicle seatback, and with means for setting the height of said body with respect to said back, which allows the height to be varied at will, whereby at least one rest position is achieved, in which the passenger removes the compressive forces of the direct weight of the head from the spinal column, and does not have to use muscle power to hold up the head, since the head remains supported by the anatomical cavity of the support body, the neck remaining held by the above-mentioned neck support, alleviating pressure and tension which are caused on the spinal column and the musculature of the neck, respectively.

BRIEF DESCRIPTION OF THE DRAWINGS

The present invention will be better understood by referring to the attached drawings in which preferred embodiments are represented.

In the drawings:

FIG. 9 shows a plan view of the neck support and load separation centre (P).

FIG. 10 shows a front view of FIG. 9.

FIG. 11 shows a view in central cross-section of the neck support and load separation centre (P).

FIGS. 12a, 12b and 12c show the neck support and load separation centre, securely holding the neck of the person.

DESCRIPTION OF PREFERRED EMBODIMENTS OF THE INVENTION

Figure 1:
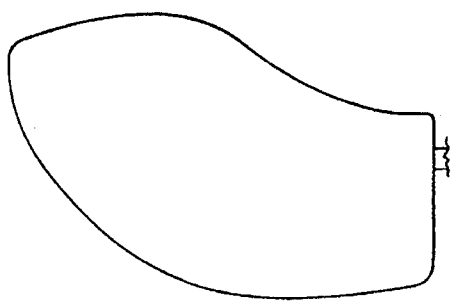
FIG. 1 shows the front face of the headrest in accordance with the invention for a vehicle.
Figure 2:
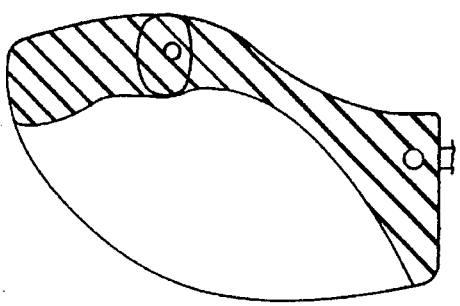
FIG. 2 shows the side face of the headrest in accordance with the invention for a vehicle.

A headrest 1 is shown in the figures, which consists of a body 2 which can be padded, which has a front face 3 and a rear face 4, and which is linked with the seatback 5 by linking means which allow it to be tipped up and adjusted in height.

The front face 3 fulfills a safety function solely, as do all known headrests, and in the event that it exhibits any specific shape, this is due to a question of design.

Figure 7:
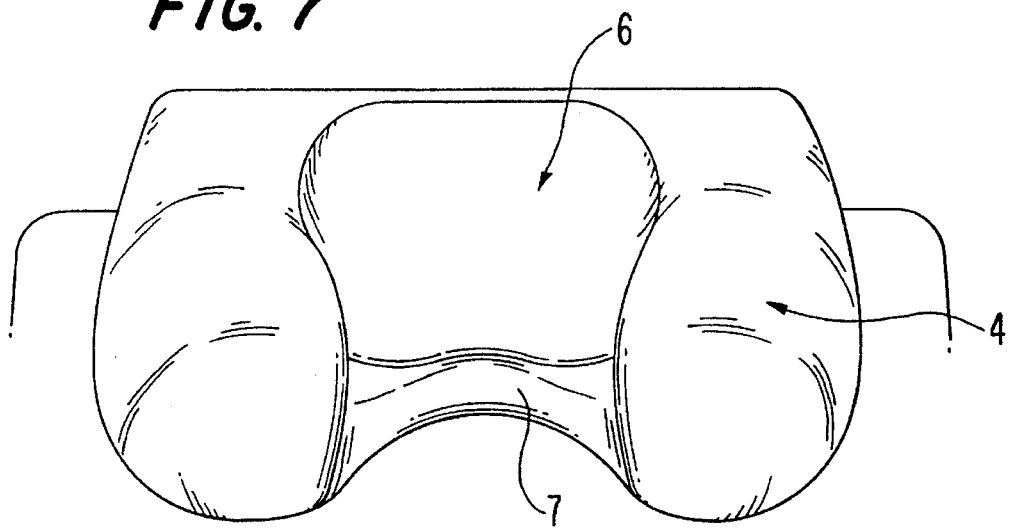
FIG. 7 shows a front view of the headrest tipped up into the position for rest.
Figure 8:
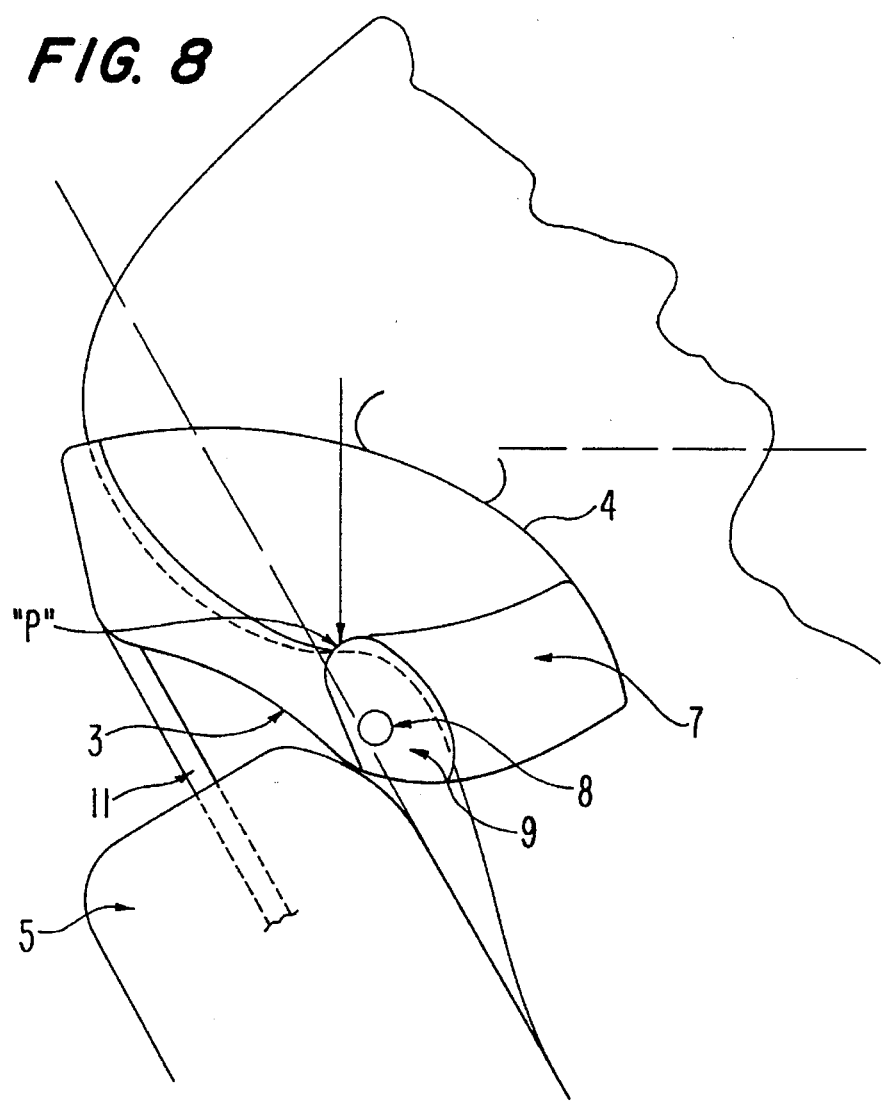
FIG. 8 shows a side view in section of the headrest tipped up into its position for rest, with the head of the user adopting the ideal rest position, and the weight of the head off-loaded directly onto the load separation point (P).

On the other hand the rear face 4 has an anatomical cavity 6, centralized in said rear face 4, and which is intersected partially by a semi-circular rim formed on the edge of said body 2, which forms a neck support and load separation centre, in order to grip the neck of the user as shown in FIGS. 7 and 8. Said support 7 has a rigid core 8 in order to prevent deformation, which is fully padded on the outside with slightly rounded edges, which, combined with its anatomical design, make it adaptable to various sizes of neck, in order to hold the user's neck comfortably and to absorb the weight of the head, in the same way as the cavity 6 for supporting the user's head, and becoming a new support point (2) on any seat where it is fitted.

Due to the particular shape of the rear face 4 of the headrest of the invention the user can relax and rest or sleep comfortably and without physically natural interruptions, since his head and his neck are retained in their position, making the movements or muscular efforts by the user unnecessary. This is due to the fact that the neck and the head are gripped in such a way that the weight falls directly on the support 7 and cavity 6, relieving compression on the spinal column and detensioning the muscle mass of the neck completely.

The support 7 for the neck of the invention is represented in FIGS. 9, 10 and 11, in various views which detail its spongy anatomical shape 9 and its rigid inner core 8.

Figure 13:
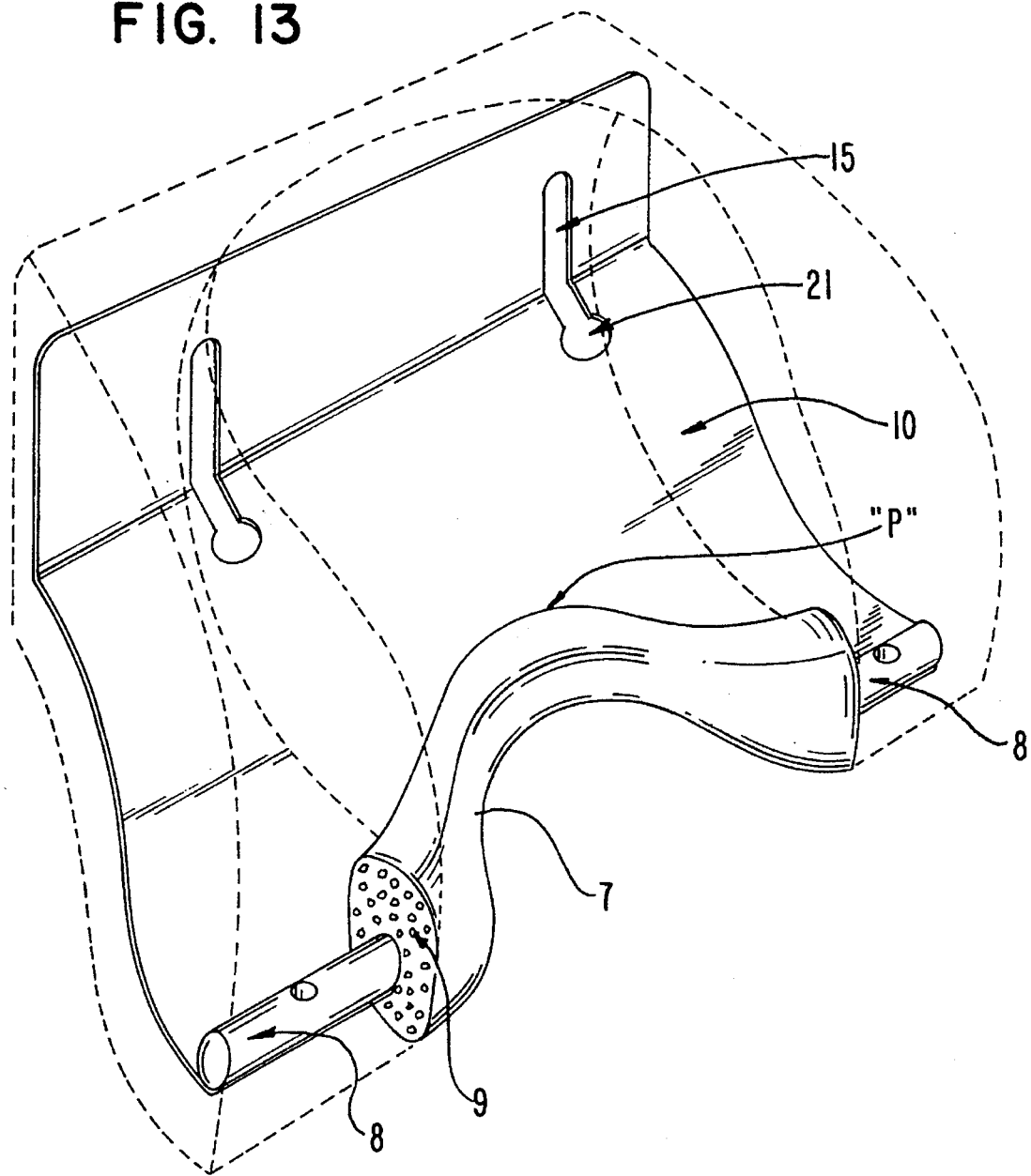
FIG. 13 shows a view in perspective of the support for the neck and load/separation centre, with the "rigid core" incorporated into the internal structure of the headrest which is the subject of the invention.
Figure 14:
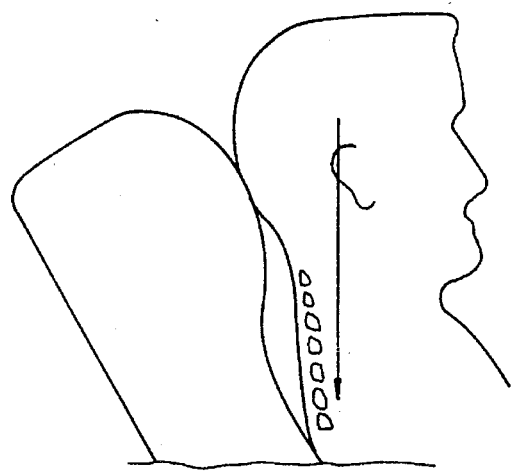
FIG. 14 shows a side view of a known seat with the support for the head on a protuberance pushed forward of the line of support of the back on the seatback, and with the weight of the head off-loaded in front of the cervical vertebrae, exerting traction and compression effects on the musculature of the neck and the spinal column, and is comparable with FIGS. 15 and 16.
Figure 15:
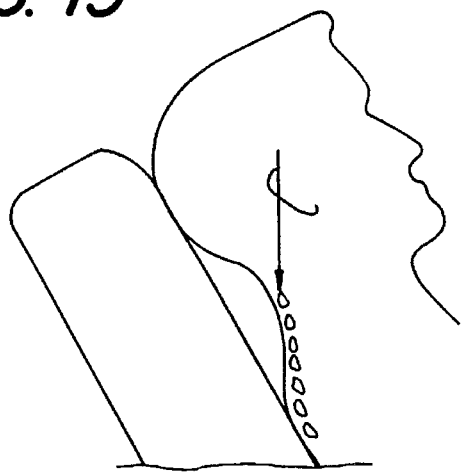
FIG. 15 shows a side view of a conventional seat with the headrest in the same line as the support for the back on the seatback, and with the weight of the head off-loaded onto the cervical vertebrae, and in which, in comparison with FIG. 14, the forward effect of traction is less.
Figure 16:
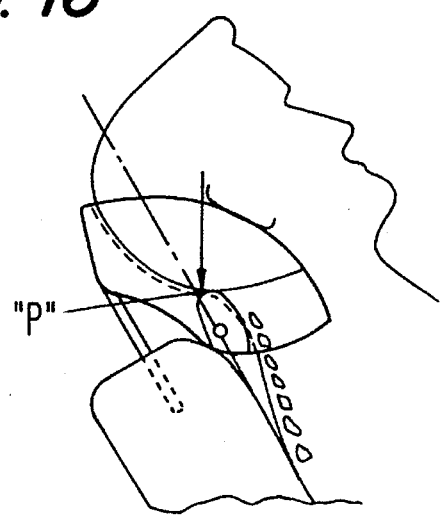
FIG. 16 shows a side view of a seat with the headrest which is the subject of the invention in its position for rest, and in which the weight of the head falls over the load separation centre (P) and the spinal column remains completely uncompressed, and the muscle mass is not subject to forward traction forces.

FIG. 13 represents a preferred but non-limiting embodiment of the support for the neck and load separation centre 7, assembled by means of a rigid core 8 to the internal structure 10 of the body of the headrest.

Figures 17, 18:
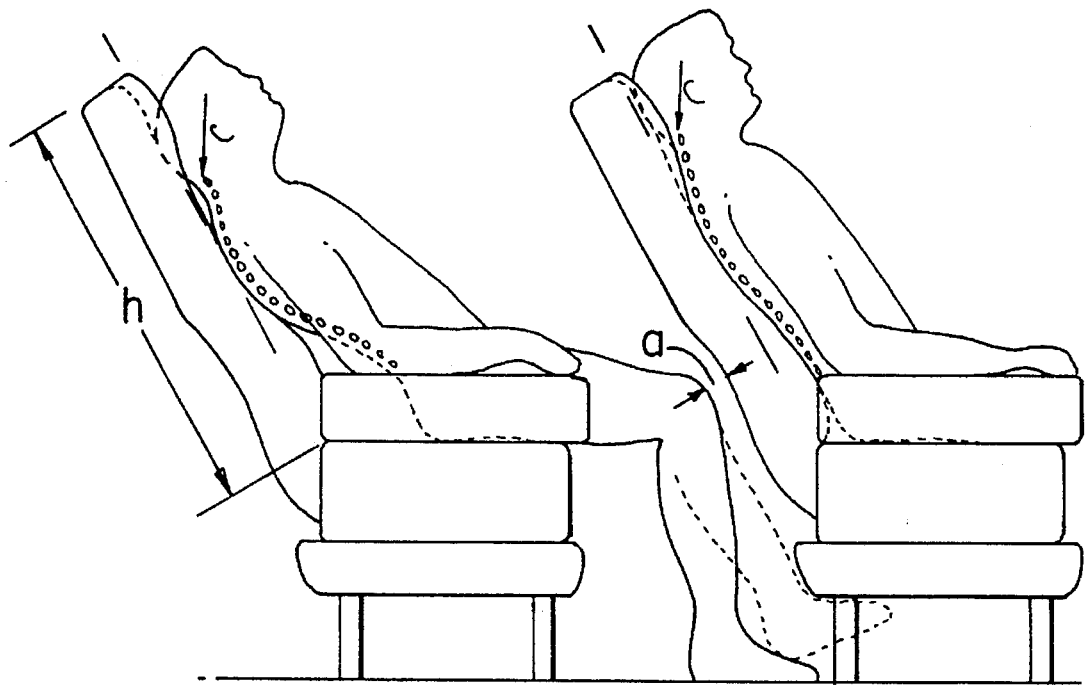
FIG. 17 shows a side view of a conventional seat, in which the person intending to place their head in the ideal position for rest, supporting the nape as far back as possible and raising the chin, slides his bottom forward and wastes useful support surface area, requiring more space for the legs, and hence the distance "a" between the knees of the passenger and the seatback in front is reduced.
FIG. 18 shows a side view of a conventional seat, and demonstrates that, when the person who is using the whole of the support surface area of the body, the head continues to exert direct pressure on the spinal column.
Figures 19, 20:
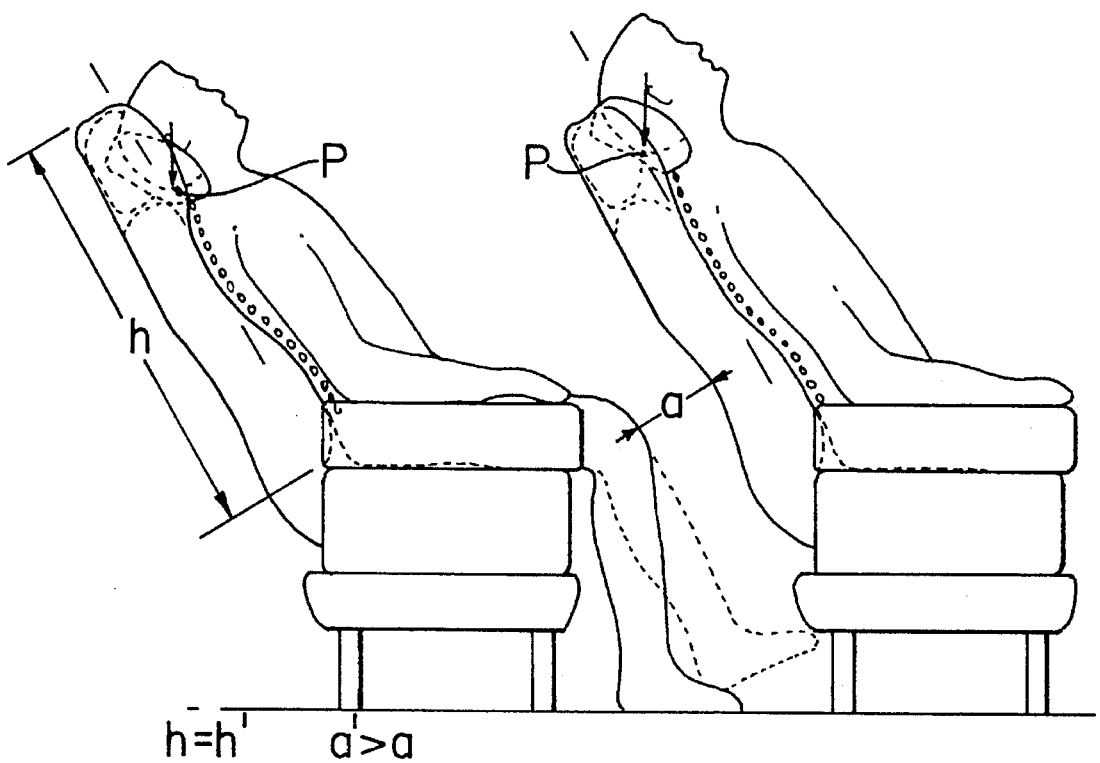
FIG. 19 shows a side view of a seat provided with the headrest which is the subject of the invention, in which the person takes advantage of the entire support surface area of the seat since it is increased by the anatomical cavity, and the passenger places his head in the ideal position for rest, without the necessity to shift his body forwards, and consequently less space is needed between rows of seats since the distance "a" increases.
FIG. 20 shows a view similar to FIG. 19, but with the headrest which is the subject of the invention raised higher in order to cope with a person of larger build, and consequently, the useful support surface area is increased even further, within a seat with the same overall measurements as in FIGS. 17 and 18.

Due to the specific shaping of the headrest, in its tipped-up position for rest, FIGS. 19 and 20, the length of the overall support of the seat is extended by the position of the anatomical cavity, within the same overall dimensions which are comparable with ordinary seats, FIGS. 17 and 18. This also allows a better way of making use of the support surface area, whereby the user does not have to contort himself, moving forwards and requiring more space in which to place his legs, distances a and a' of the above-mentioned figures.

Figure 21A:
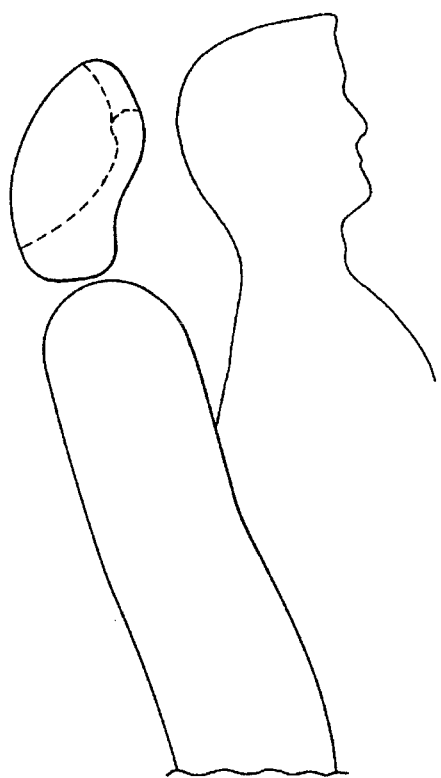
FIGS. 21a, 21b, 21c and 21d show the headrest which is the subject of the invention in various positions of use.
Figure 21B:
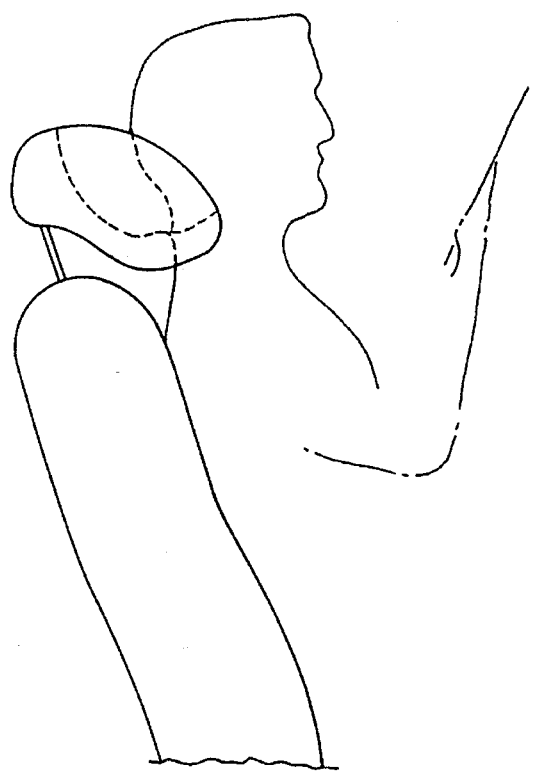
Figure 21C:
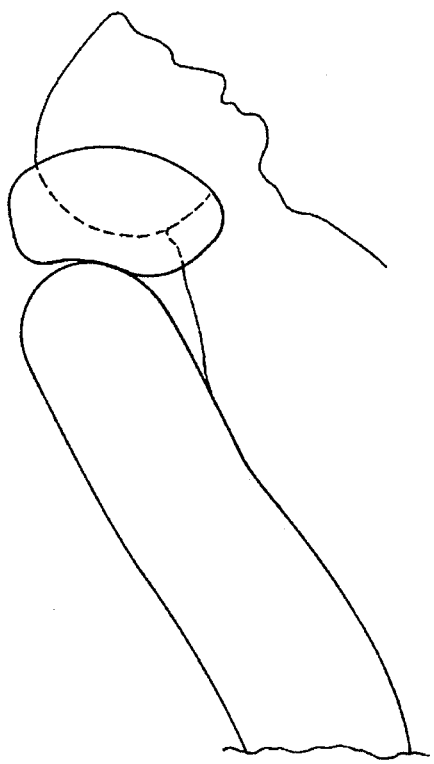
Figure 21D:
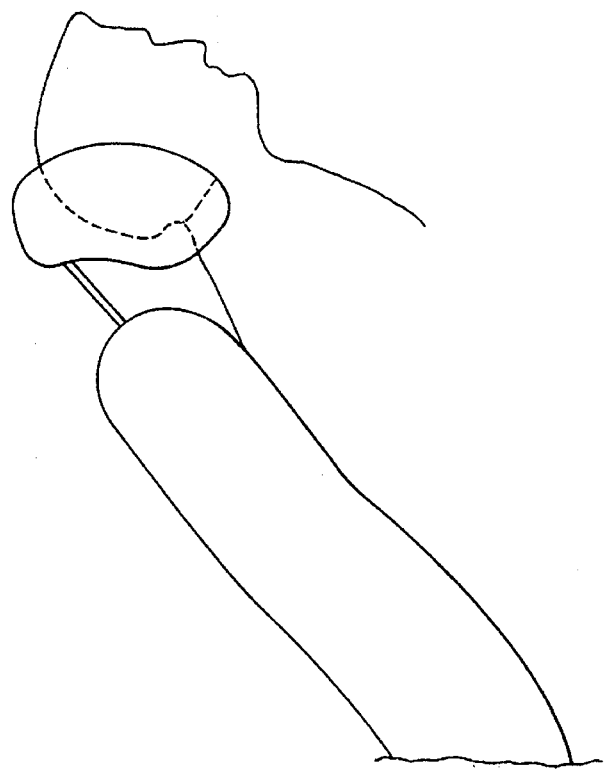

In accordance with what is represented in FIGS. 21a, 21b, 21c and 21d, the headrest which is the subject of the invention, by means of the use of means of linking to the seatback, means of pivoting and height adjustment, can adopt various positions, which allows the user to use it as a conventional headrest in its vertical position, FIG. 21a, in a position for supporting the neck only in order to read, FIG. 21b, in a rest position with the seatback inclined, FIG. 21c, and in a rest position with the seatback inclined and the headrest raised, FIG. 21d, for a person of larger build than the one represented in FIG. 21c.

Figure 3:
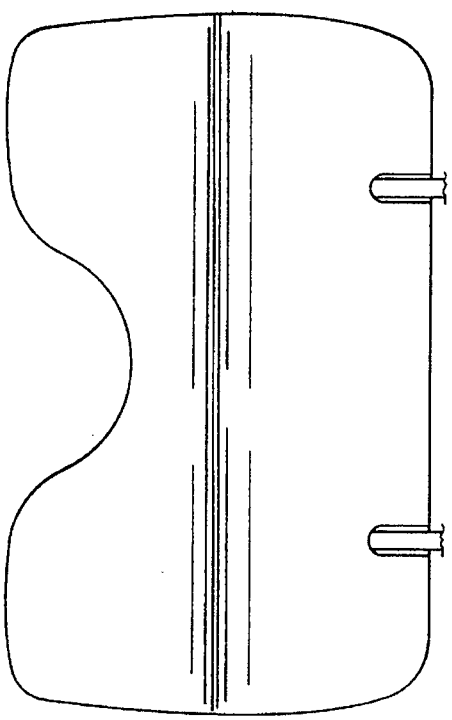
FIG. 3 shows the rear face of the headrest which is the subject of the invention.
Figure 4:
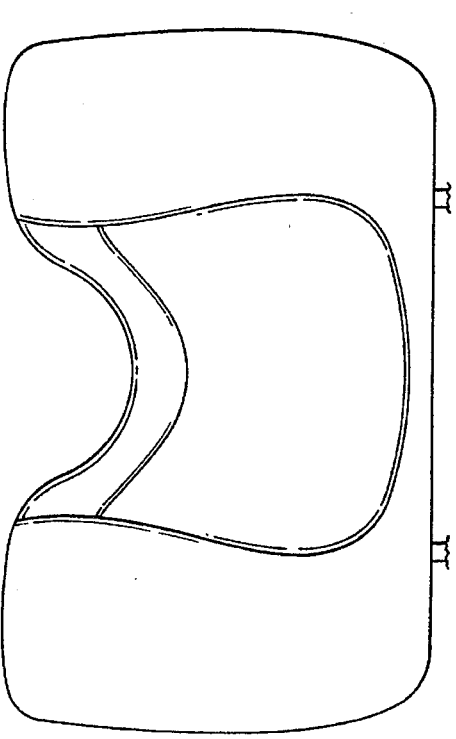
FIG. 4 shows a view in central cross-section of FIG. 3.
Figure 5:
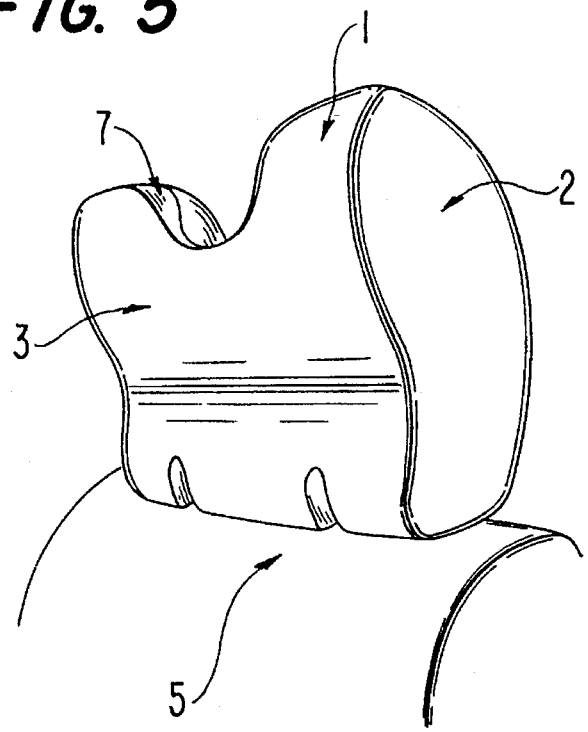
FIG. 5 shows a front view in perspective of the headrest which is the subject of the invention.
Figure 6:
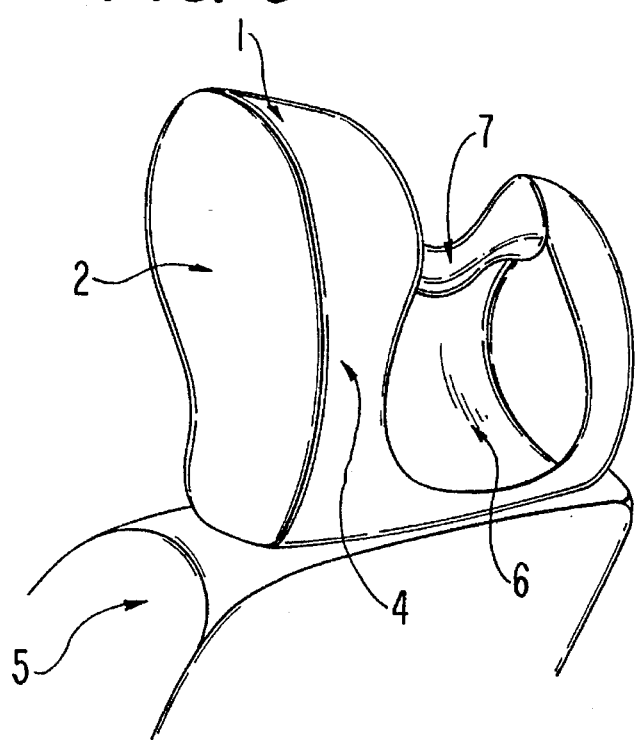
FIG. 6 shows a rear view in perspective of the headrest which is the subject of the invention.

A preferred but non-limiting embodiment of the headrest of the invention is represented in FIGS. 3 and 4.

Figure 22:
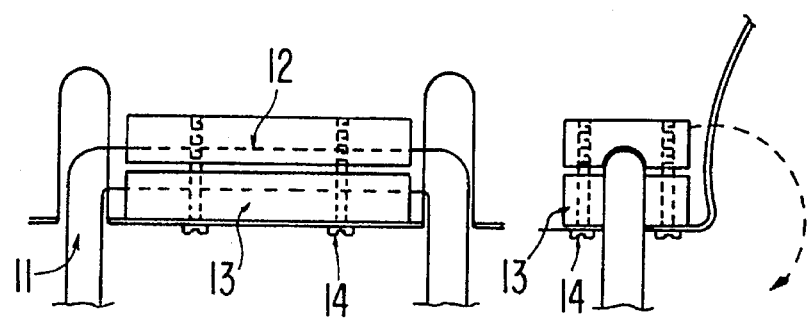
FIG. 22 shows a mechanism for rotating and varying the height of the headrest, produced with a double rod combined with a friction box.
Figure 23:
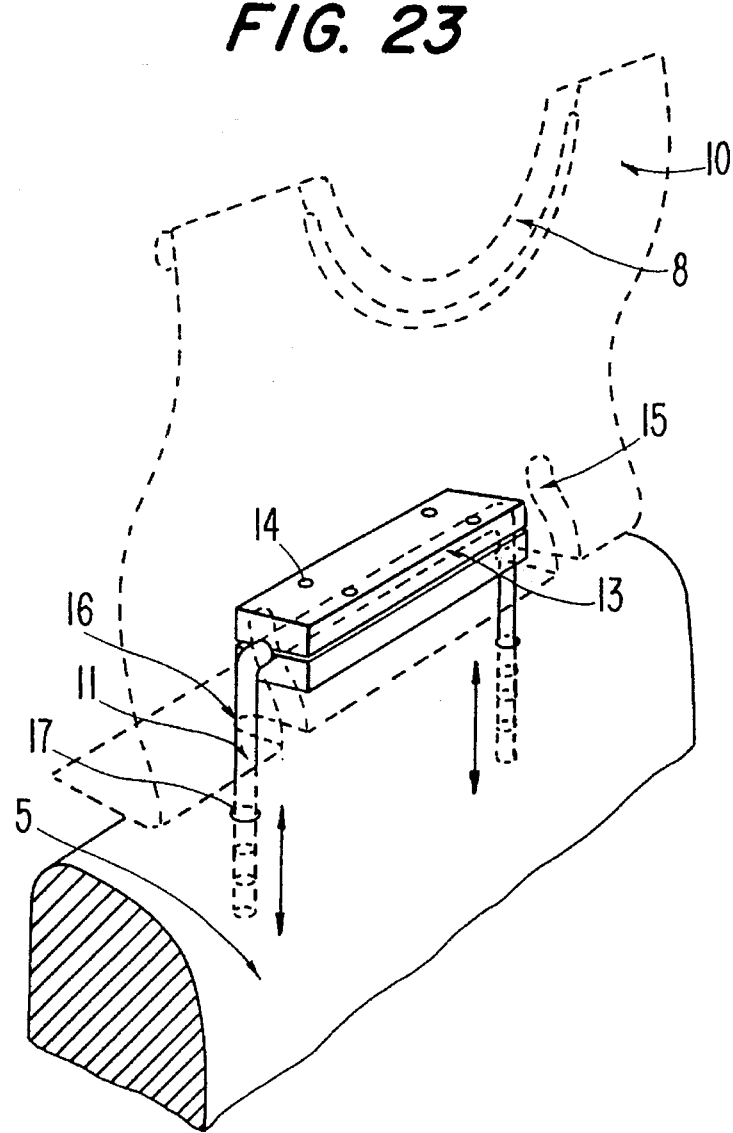
FIG. 23 shows a perspective of the mechanism of FIG. 22 within the structure of the body of the headrest and in the form of a link with the seatback.

FIGS. 22 and 23 represent a mechanism for a preferred but non-limiting embodiment of the headrest of the invention, in which the linking, pivoting and height-setting means consist of two rods 11 joined together in a horizontal shaft 12, pivoting within a friction box 13, with pressure regulators 14 integral with the internal structure 10 of the body 2 which has front exits 15 of the rods 11 in order to be tipped-up, and rear catch 15 for its safety position with the body 2 vertical, and which is inserted into the seatback 5 through the orifices 17 and includes a known height adjuster within the seatback 5, using the rods 11.

Figure 24:
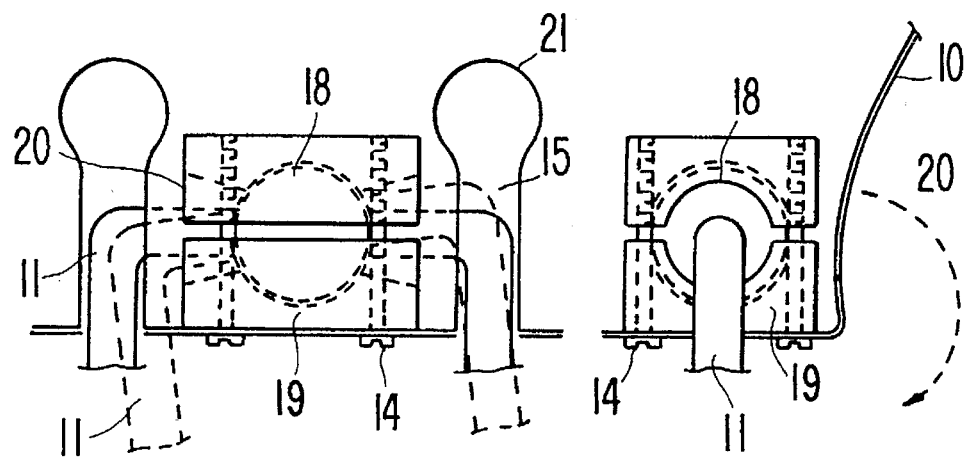
FIG. 24 shows a frontal rotation mechanism, supplemented with a means for easy lateral inclination into its tip-up position.
Figure 25:
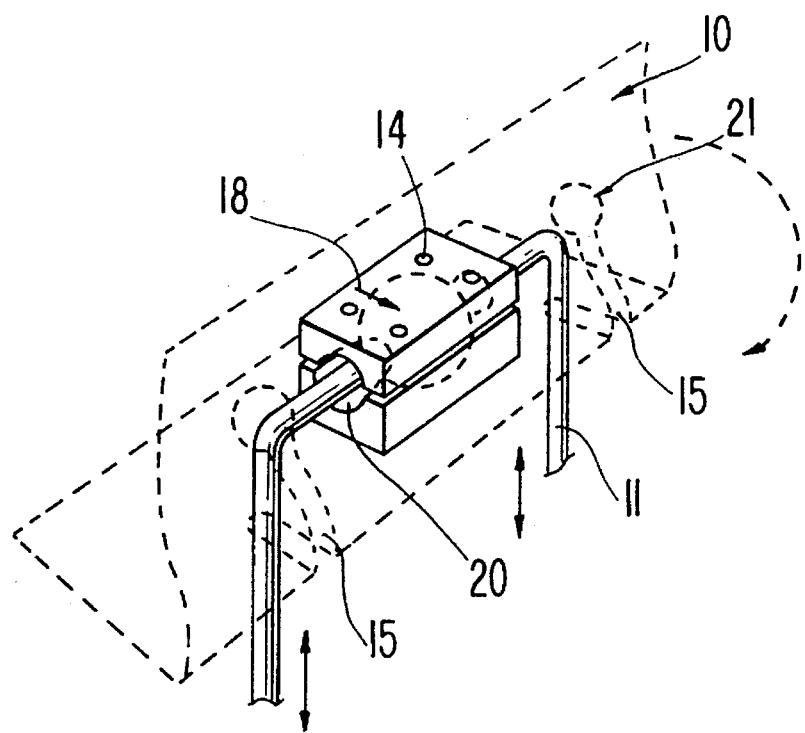
FIG. 25 shows a perspective of the mechanism of FIG. 24 within the structure of the body of the headrest.

FIGS. 24 and 25 show another preferred but non-limiting form of the mechanism for moving the body 2 of the headrest of the invention, in which the means for linking the seatback 5 are two rods 11 which are curved at their ends at 90° and are joined together by a sphere 18, fitted between a friction ball joint casing 19, with pressure regulators 14, and rod exit 11 in conical form 20, integral with the internal structure 10 of the body 2 with a rod exit 15 for tipping-up, and rounded head 21 in order, in the tipped-up position, to allow a limited lateral inclination movement, and which is inserted into the seatback and includes means for altering the height by means of known rods 11.

It is clear that the linking means may consist of any system which allows the headrest to be fitted to the seatback and to take up separate positions with respect thereto.

Having described preferred embodiments of the present invention, it will be understood that variations and modifications thereof falling within the scope of the invention may become apparent to those skilled in the art, and the scope of the invention is determined by the appended claims and their equivalents.

What is claimed is:

1. A dual-aspect headrest especially suitable for use on a vehicle having a seatback for supporting a user of the vehicle, which headrest comprises:

(a) a support body having (i) a front face and (ii) a rear face having an anatomical cavity therein for supporting the head of a user of the vehicle, said body having in an upper edge thereof a non-deformable neck support having the shape of a semicircle and having an inner part, said neck support being open toward said rear face, and intersecting said anatomical cavity, and having a rigid inner core incorporated in the internal structure of the body, and a spongy material covering said core;

(b) pivoting means pivotally connected to said body for pivoting said body around a horizontal axis and allowing the body to be flipped over the seatback between a first position at which the front face faces the head of a user and a second position at which the rear face faces the head of a user, so that the anatomical cavity and the neck support are positioned to receive, respectively, the head and neck of a user; and (c) linking means for linking said body to said seatback, said linking means being connected to said pivoting means.

2. A dual-aspect headrest, in accordance with claim 1, wherein said linking means comprise means for regulating the height of the body with respect to the seatback.

3. A dual-aspect headrest, in accordance with claim 1, wherein said body is made of spongy material.

4. A dual-aspect headrest, in accordance with claim 1, wherein when said body is in said second position said neck support is adapted to hold the user's neck and absorb the weight of a user's head.

5. A dual-aspect headrest, in accordance with claim 1, wherein when said body is in said second position said neck support is adapted to stretch a user's nape behind a line of support of a user's back on the seatback.

6. A dual-aspect headrest, in accordance with claim 1, wherein in its when said body is in said second position said neck support is adapted to absorb the weight of a user's head directly onto the inner part of the semicircle.

7. A dual-aspect headrest, in accordance with claim 1, wherein said anatomical cavity, when said body is in said second position, is located behind the line of support of a user's back on the seatback.

8. A dual-aspect headrest, in accordance with claim 1, wherein said anatomical cavity, when said body is linked to said seatback and is in said second position, extends the length of the support surface area of the seatback to a length greater than that of the seatback without said body linked thereto.

9. A dual-aspect headrest in accordance with claim 1, wherein said pivoting means comprises a friction box, a horizontal shaft pivotally mounted in said friction box, and one or more pressure regulators attached to said friction box, and wherein said linking means comprises two vertical shafts each connected to one end of said horizontal shaft.

10. A dual-aspect headrest in accordance with claim 1, wherein said pivoting means comprises a friction box, a friction ball joint sphere pivotally mounted in said friction box, one or more pressure regulators positioned in said friction box, and two rods joined together by said sphere, each rod extending horizontally through a coaxial rod exit in said friction box and connected to said linking means.

* * * * *